United States Patent [19]
Harvey et al.

[11] 3,735,676
[45] May 29, 1973

[54] EXPOSURE CONTROL MECHANISM FOR PHOTOGRAPHIC CAMERAS

[75] Inventors: Donald M. Harvey, Webster; David L. Babcock, Rochester, both of N.Y.

[73] Assignee: Eastman Kodak Company, Rochester, N.Y.

[22] Filed: Sept. 7, 1971

[21] Appl. No.: 178,146

[52] U.S. Cl.............................95/10 CT, 95/53 EB
[51] Int. Cl..........................G03b 7/08, G03b 9/62
[58] Field of Search.............95/10 C, 10 CT, 10 CE, 95/53 E, 53 EA, 53 EB, 55

[56] References Cited
UNITED STATES PATENTS

| | | | |
|---|---|---|---|
| 3,589,251 | 6/1971 | Webb | 95/10 C |
| 3,476,031 | 11/1969 | Starp | 95/53 EB X |
| 3,563,143 | 2/1971 | Petersen | 95/10 CT |
| 3,605,587 | 9/1971 | Speckhart | 95/10 CT |

FOREIGN PATENTS OR APPLICATIONS 1,501,660  10/1967  France.............................95/10 CT Primary Examiner—Joseph F. Peters, Jr.
Attorney—W. H. J. Kline et al.

[57] ABSTRACT

A shutter mechanism wherein a shutter blade is mounted for movement from a first exposure aperture blocking position to an exposure aperture unblocking position in which the shutter blade is retained until a transducer controlled by a light-integrating timing circuit is actuated to release the shutter blade for movement to a second exposure aperture blocking position. According to one embodiment, a shutter blade having an aperture is retained in a first exposure aperture blocking position and adapted to be released for movement under a spring bias into engagement with a stop that positions the blade aperture in alignment with the exposure aperture, and when the transducer is actuated the blade is moved to a second exposure aperture blocking position.

9 Claims, 12 Drawing Figures

PATENTED MAY 29 1973　　　　　　　　　　　　　3,735,676

DONALD M. HARVEY
DAVID L. BABCOCK
INVENTORS

BY
ATTORNEYS

DONALD M. HARVEY
DAVID L. BABCOCK
INVENTORS

ATTORNEYS

DONALD M. HARVEY
DAVID L. BABCOCK
INVENTORS

BY

ATTORNEYS

3,735,676

EXPOSURE CONTROL MECHANISM FOR PHOTOGRAPHIC CAMERAS

BACKGROUND OF THE INVENTION

1. Field of the Invention

This invention relates generally to shutter mechanisms for use in cameras, and more particularly to shutter mechanisms controlled by light-integrating, timing circuits for establishing shutter speed in accordance with the level of scene illumination.

2. Description of the Prior Art

Many photographic cameras presently available are provided with automatic shutter systems of the type including a light-integrating timing circuit for determining shutter speed. Typically, the timing circuit is activated in synchronization with movement of an opening blade or blade ring to initiate an exposure interval, and the circuit subsequently actuates a closing blade or blade ring to terminate the exposure interval after a time period established by the timing circuit in accordance with the intensity of light received by a photocell in the circuit. There are many known shutter blade arrangements employed in such systems. For example, the opening blade typically is releasably held in an aperture blocking position by a camera release lever, and is moved under the influence of a bias to uncover the aperture. The timing cycle is usually initiated upon actuation of the release lever or upon the movement of the opening blade. The closing blade is usually retained in an aperture unblocking position by an electromagnet attracting a keeper on the blade. When the timing cycle has been completed the control circuit deenergizes the electromagnet to release the closing blade for movement to an aperture blocking position, terminating the exposure.

Such shutter mechanisms require the use of numerous moving parts, including a plurality of blades or blade operating members, which increases manufacturing costs and the incidence of operational failures.

SUMMARY OF THE INVENTION

Therefore, it is an object of the present invention to provide a simplified and improved shutter mechanism of the type including a light-integrating, timing circuit for establishing shutter speed.

It is another object of the present invention to provide such an improved shutter mechanism utilizing a single shutter blade for initiating and terminating exposures.

These and other objects are accomplished according to one embodiment of the invention by shutter apparatus for controlling the exposure of an aperture to scene light wherein a shutter blade is mounted for movement from a first position blocking the exposure aperture to an unblocking position wherein the aperture is exposed to scene light. An exposure interval is established for the blade to remain in the unblocking position by an electronic circuit for establishing the exposure interval as a function of the intensity of the scene light. The electronic circuit contains a transducer, actuatable by the electronic circuit at the end of the exposure interval, for actuating the blade to a second aperture blocking position. In a preferred embodiment, an apertured shutter blade is releasably retained in the first exposure aperture blocking position, and is biased for movement upon release toward the aperture unblocking position where the shutter aperture and exposure aperture are aligned. In the aperture unblocking position the blade is held by a stop for a period of time determined by the electronic circuit. Upon actuation of the transducer by the timing circuit at the end of the exposure interval, the blade pivots and moves toward a second exposure aperture blocking position.

In another illustrative embodiment, the blade is retained in a first exposure aperture blocking position wherein it is biased for movement to an aperture unblocking position upon actuation of the transducer. Upon deactuation of the transducer, the blade is biased to move toward a second aperture blocking position.

BRIEF DESCRIPTION OF THE DRAWINGS

Other objects and advantages of the invention will become apparent from the following detailed description with reference to the drawings, in which.

DETAILED DESCRIPTION OF THE PREFERRED EMBODIMENT

Because cameras are well known, the present description will be directed to elements forming part of, or cooperating more directly with the present invention. Camera parts not specifically shown or described may take forms well known to those skilled in the art.

Figure 1:
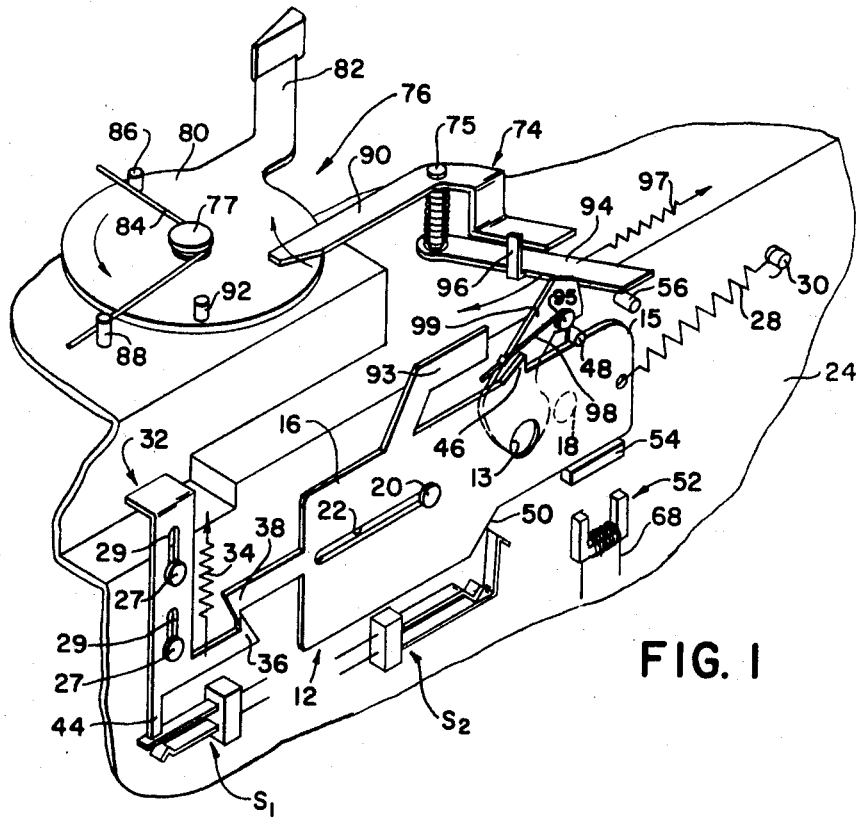
FIG. 1 is a perspective view of a shutter control apparatus according to the invention, shown in a cocked condition, with a blade in a first, aperture blocking position.

Referring now to the drawings, there is shown in FIG. 1 a shutter mechanism according to one illustrative embodiment of the invention, including an elongated shutter blade 12 defining an aperture 13 in the control portion thereof, between two end portions 15 and 16, each of which is sufficiently large to cover an exposure aperture 18. In the cocked position of the shutter mechanism, as shown in FIG. 1, the blade 12 is in a first aperture blocking position in relation to the exposure aperture 18, and the end portion 15 of the blade 12 covers the exposure aperture 18. Blocking and unblocking positions of the blade 12 refer to positions that the blade 12 may take with respect to the exposure aperture 18, to block or pass incidence scene light through the exposure aperture 18. The blade 12 is mounted on a pin 20, secured on a support structure 24, and received in a slot 22 of the blade 12, to permit pivotal movement and lateral movement of the blade with respect to the exposure aperture 18. As further shown in FIG. 1, the blade 12 is retained in the cocked position against the bias of a spring 28, secured by a pin 30 on the support structure 24, by a releasable latch member 32. The latch member 32 is biased to a latching position by a spring 34, and may include a portion accessible from the exterior of the camera, for manual actuation. The latch member 32 is mounted for axial movement by pins 27 received in slots 29, and in the cocked position of FIG. 1 an extension 36 of the latch member 32 engages an extension 38 of the blade 12.

Figure 3:
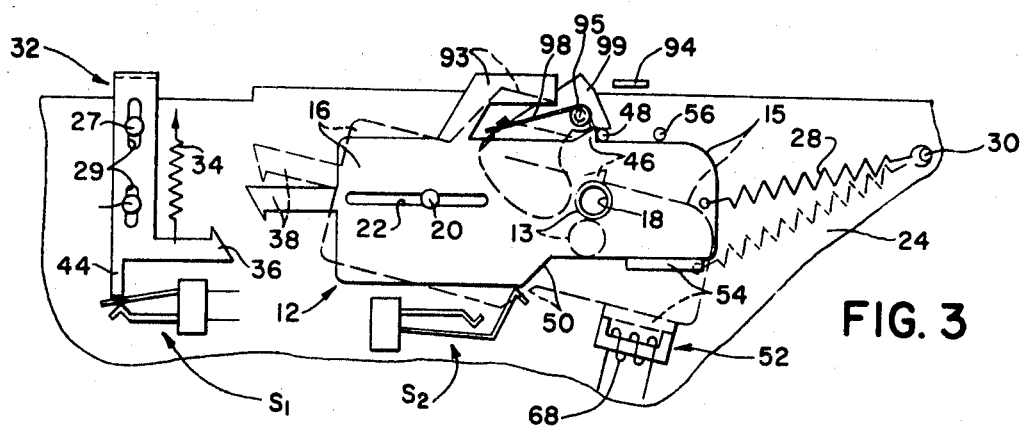
FIG. 3 is an elevational view of the blade of the apparatus of FIG. 1, shown in an intermediate or exposure aperture unblocking position, including phantom lines showing the position of the blade as an electromagnet attracts the blade.

To operate the shutter mechanism to initiate an exposure, the latch member 32 is depressed and moves axially against the bias of the spring 34. As shown in FIG. 3, axial movement of the latch member 32 brings a downward extending finger 44, on the latch member 32, into contact with, and closes, a normally open switch S1, thereby energizing an electronic, timing circuit, to be discussed later. Further axial movement of the latch member 32 releases the extension 36 from the blade 12 to permit the blade 12 to move laterally to the right under the influence of the spring 28. As further shown by the solid lines of FIG. 3, the blade 12 moves to an intermediate or exposure aperture unblocking position, and is retained by engagement of a detent 46, integrally with the blade 12, and a stop member 48 affixed to the support structure 24. By engagement with the top portion of the blade 12, the stop member 48 also acts as a guide as the blade 12 moves laterally. In the intermediate position the blade aperture 13 is aligned with the exposure aperture 18. During movement of the blade 12 to initiate an exposure interval, a switch S2 in the electronic timing circuit is opened by engagement with a cam surface 50 on the bottom of the blade 12.

Figure 4:
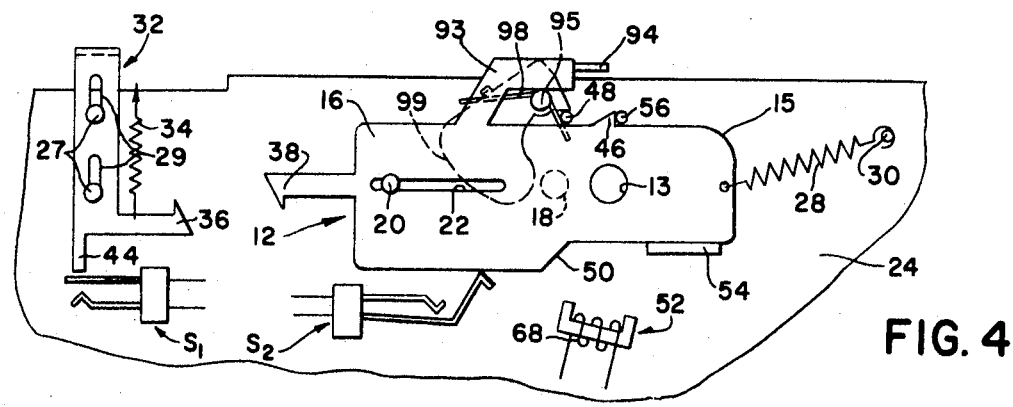
FIG. 4 is an elevational view of the blade of the apparatus in FIG. 1, shown in the second aperture blocking position, after termination of the exposure interval.

To terminate the exposure at the end of the timed interval, there is provided a transducer, such as for example, an electromagnet 52 as shown in FIG. 1, positioned in a spaced relation to a metal keeper 54 fixedly attached to the bottom portion of the blade 12. The electromagnet 52 is actuated by the electronic timing circuit, and as shown by the phantom lines of FIG. 3, the electromagnet 52 will attract the metal keeper 54 on the blade 12, and pivot the blade 12 about the pin 20, to free the detent 46 from the stop 48. Under the influence of the spring 28, the blade 12 then moves further to the right to a second aperture blocking position as shown in FIG. 4, where the motion of blade 12 is arrested by a pin 56 affixed to the support structure 24. In this second aperture blocking position, the end portion 16 covers the exposure aperture 18.

Figure 2:
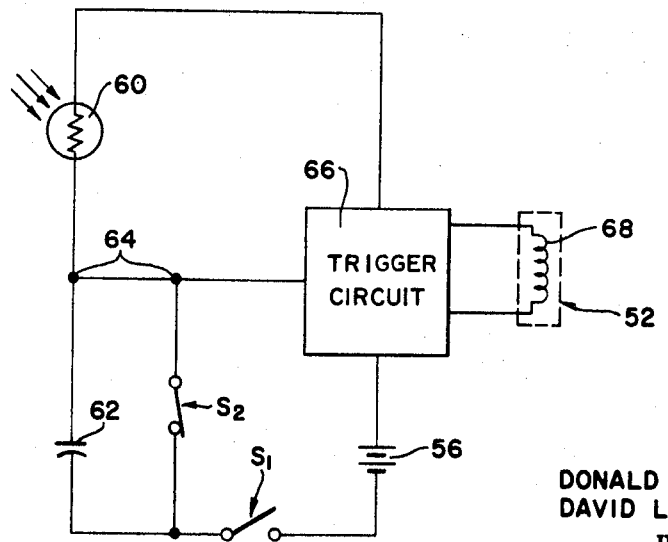
FIG. 2 is a schematic diagram of a light-integrating, timing circuit for controlling exposure time for the apparatus in FIG. 1.

To control the time interval of the exposure, the circuit shown in FIG. 2 may be employed with the shutter mechanism. The circuit is energized by closure of the switch S1, and includes a voltage source 56, a voltage sensitive trigger circuit 66, the electromagnet 52, and a light integrating timing network including a photocell 60 in series with a capacitor 62. The photocell 60 may in one illustrative embodiment of this invention be a conventionally used selenium photocell, which has the property that its resistance varies inversely with the amount of light incidence on the photocell. The switch S2, which shunts the capacitor 62, is normally closed so that the capacitor 62 is normally completely discharged. Thus, at initiation of the exposure, when the switch S2 is opened by movement of the blade 12, the voltage at a junction 64 between the photocell 60 and the capacitor 62 changes from its initial value, usually ground potential, to a predetermined value in a period of time depending on the well known time constant R-C of the integrating network. The R-C time constant of the integrating network is determined by the capacitance of the capacitor 62, and the resistance of the photocell 60 as established by the intensity of light incidence on the photocell 60. A bright scene condition produces a low resistance value of the photocell 60, to provide a small R-C time constant for the circuit, and would result in a short exposure time. Conversely, a low level of scene brightness produces a high photoresistance value, and a resulting longer time constant for the circuit, to produce a long exposure time.

The junction 64 is connected to the input terminal of the trigger circuit 66 which is adapted to conduct current through a winding 68, of electromagnet 52, when the bias potential at the input exceeds a predetermined value, and to be non-conducting when its input is below that value. Thus, when switch S2 is opened, the voltage level at junction 64 begins to increase to the predetermined value, which causes the trigger circuit 66 to switch from its nonconductive state to its conductive state. As the trigger circuit 66 conducts, and current flows in the winding 68, the electromagnet 52 is energized and attracts the metal keeper 54, permitting the blade 12 to close. Of course, it is understood that various types of trigger circuit well known in the art may be employed in the practice of this invention. One well known example of such a circuit is a voltage sensitive trigger circuit such as described in U.S. Pat. No. 3,200,723. Thus, the exposure interval is initiated substantially simultaneously with the activation of the integrating circuit, and it is terminated by the trigger circuit 66 after a period of time determined by the integrating circuit, in accordance with the scene light incidence on the photocell 60.

Figure 5:
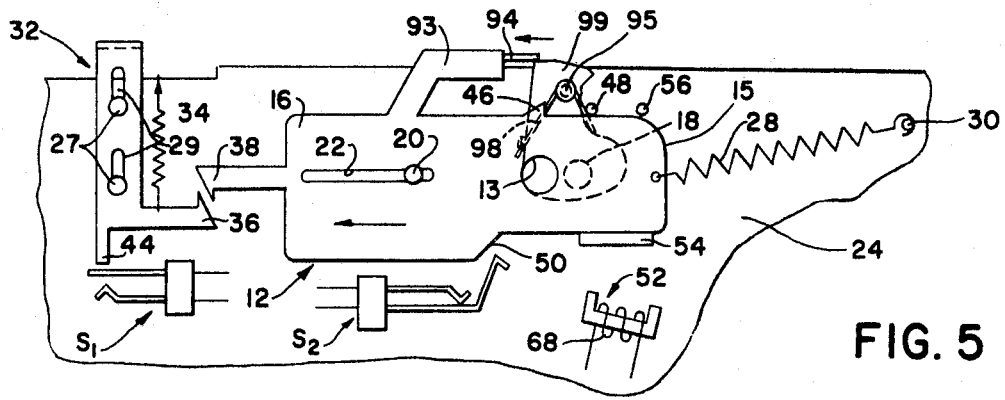
FIGS. 5 and 6 are elevational views of the blade of the apparatus of FIG. 1 showing the respective positions of a capping blade with respect to the exposure aperture, and to the blade aperture during the shutter reset.
Figure 6:
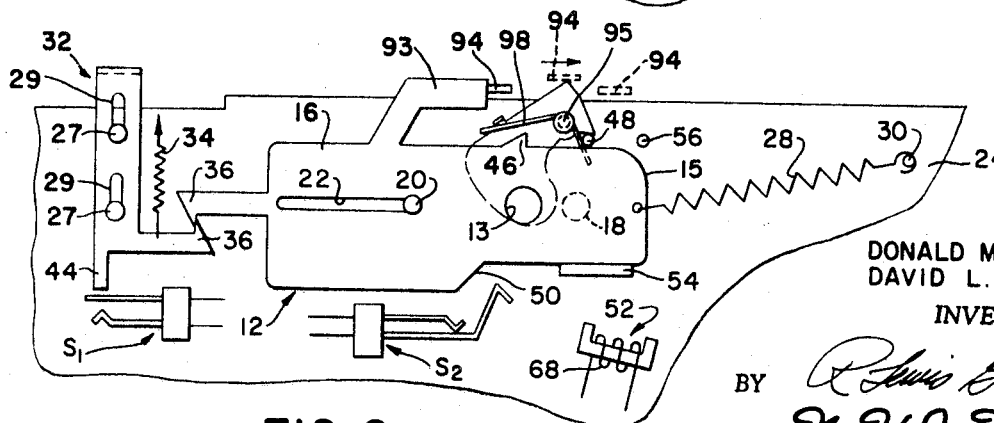

To enable the shutter mechanism to be cocked, a cocking mechanism 76 is provided, which may be any conventional cocking mechanism such as often used to reset a shutter mechanism and advance film. As shown in FIG. 1, the cocking mechanism 76 may include a member 80, mounted for circular motion about a pin 77, and having an engageable extension 82, accessible from the camera exterior. The member 80 is biased to the position of FIG. 1 by a spring 84 engaging pins 86 and 88, on the camera support structure 24 and the member 80 respectively. The cocking mechanism may also include a lever mechanism 74, pivotally mounted on a pin 75 and operatively coupled to the member 80 by means of an arm 90. The arm 90 is positioned to engage a pin 92 on the member 80 during the cocking of the mechanism 76. The lever mechanism 74 includes a second arm 94, also pivotal on the pin 75. The arm 94 engages the arm 90 by means of detent 96, and is biased to the position of FIG. 1 by a spring 97, wherein it engages a capping blade 99, pivotally mounted on a pin 95. As the member 80 is rotated about the pin 77, the pin 92 engages the arm 90, moving it against the bias of the spring 97, to engage the capping blade 99. As shown in FIGS. 5 and 6, the capping blade 99 moves against the bias of a spring 98 to cover the exposure aperture 18 as the return motion of the blade 12 brings the blade aperture 13 over the exposure aperture 18. Movement of the arm 94 brings it into engagement with an extension 93 of the blade 12, and urges the blade 12 into engagement with the latch member 32 to latch the blade 12 in the cocked condition of FIG. 1.

While this invention has been described in connection with a single blade and an electromagnet which attracts the blade to impart pivotal movement to the blade, one skilled in the art will appreciate that the embodiment as shown in FIG. 1, wherein the electromagnet 52 attracts the metal keeper 54 imparting pivotal motion to the blade, may be replaced with an electromagnet or similar transducer device adapted to repel the metal keeper 54 positioned atop the blade 12, thereby imparting a pivotal motion to the blade 12.

Referring now to FIGS. 7-12, alternative embodiments of the invention will be described. Elements that were previously described with reference to the embodiment of FIG. 1, that are common to the alternative embodiments, and whose function does not change, will carry the same numeral as FIG. 1 but will be designated by a suffix (a) or (b).

Figure 7:
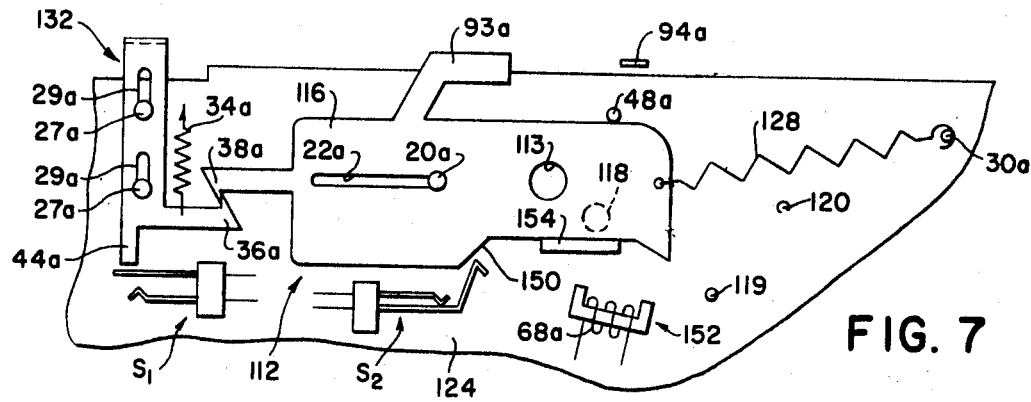
FIG. 7 is an elevational view of another embodiment of the apparatus of FIG. 1, shown with the blade in the first aperture blocking position with the electromagnet positioned to attract the blade and retain the blade against a stop when the blade is in the intermediate or aperture unblocking position.
Figure 8:
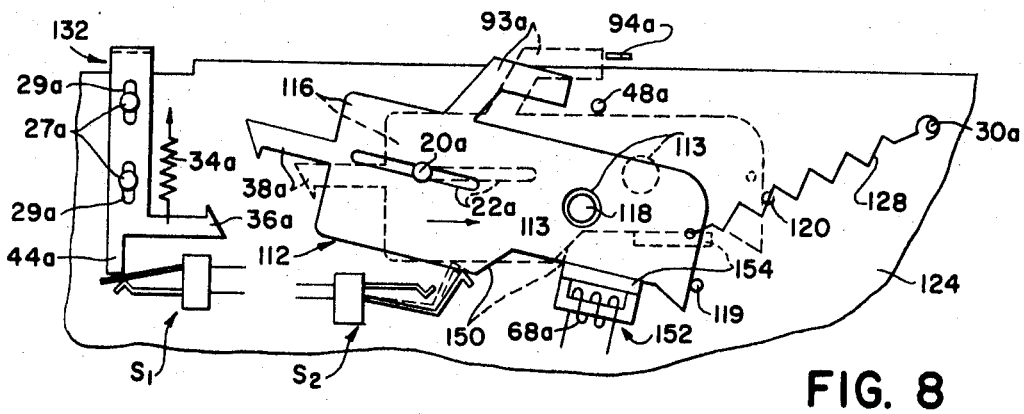
FIG. 8 is an elevational view of the blade of the apparatus of FIG. 7 showing the electromagnet retaining the blade against the stop when the blade is in the aperture unblocking position.
Figure 9:
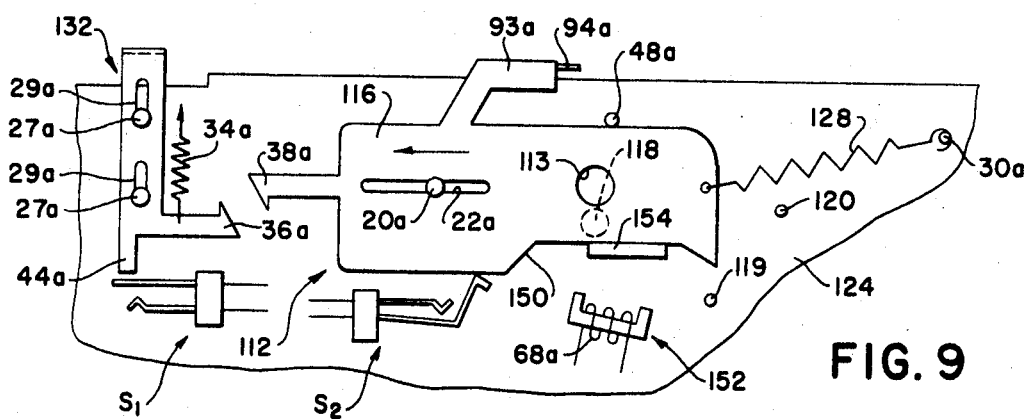
FIG. 9 is an elevational view of the apparatus of FIG. 7, shown in the second aperture blocking position, after the termination of the exposure interval.

One alternative embodiment of the invention is shown in FIG. 7, wherein a blade 112, defining an aperture 113 between ends 115 and 116, is retained in a first blocking position in relation to an exposure aperture 118, by a latch member 132, against the bias of a spring 128. In the first blocking position, the blade aperture 113 is positioned above and offset from the exposure aperture 118 so that the end 115 of the blade 112 covers the exposure aperture 118. An electromagnet 152, initially deenergized, is energized as the switch S1 is actuated, and attracts a metal keeper 154 on the blade 112. As shown in FIG. 8, the attraction of the metal keeper 154 to the electromagnet 152 pivots the blade 112 downward, permitting the blade 112 to move to the intermediate position where it engages a pin 119, on a camera structure 124. At the position where the blade 112 engages the pin 119, the aperture 113 and 118 are aligned. During the timed exposure interval, the blade 112 is held in contact with the pin 119 by engagement of the electromagnet 152 and the metal keeper 154. As further shown in FIG. 8, the spring 128 is positioned to exert a bias on the blade 112 in a direction against the direction of the electromagnet's attraction for metal keeper 154, and against the engagement of the blade 112 with the pin 119. In this manner, when the electromagnet 152 deenergizes, at the end of the exposure interval, the bias of the spring 128 will urge the blade 112 up, and to the right, as shown by the phantom lines in FIG. 8, to terminate the exposure. If the electromagnet 152 does not hold the blade 112, due to a low camera power source, the blade 112 of the embodiment of FIGS. 7-9 will be momentarily urged against the pin 119 by the spring 128; however, due to the spring 128 biasing the blade 112 in a direction away from the pin 119, the blade 112 will move to the aperture blocking position of FIG. 8.

As with the blade 12, FIG. 1, the blade 112 of FIG. 7 may be cocked by means of a mechanism such as the cocking mechanism 76 of FIG. 1. The capping blade 99 of FIG. 1 may not be required in the apparatus of FIG. 7 since the blade 112 is urged upward against the pin 48a and the blade aperture 118 will not come into realignment with the exposure aperture 113 during cocking.

Figure 10:
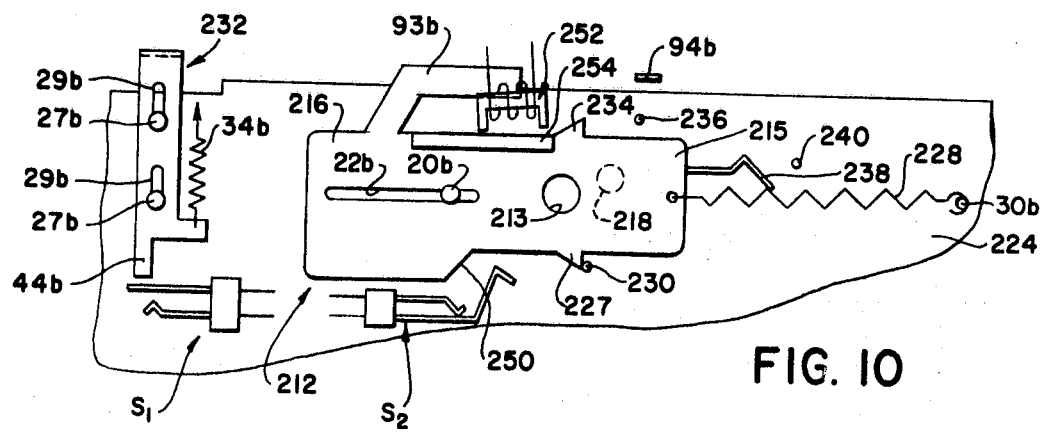
FIG. 10 is an elevational view of another embodiment of the apparatus of FIG. 1 shown with the electromagnet positioned to direct the blade to the intermediate or aperture unblocking position, and to retain the blade against a stop during the exposure interval.
Figure 11:
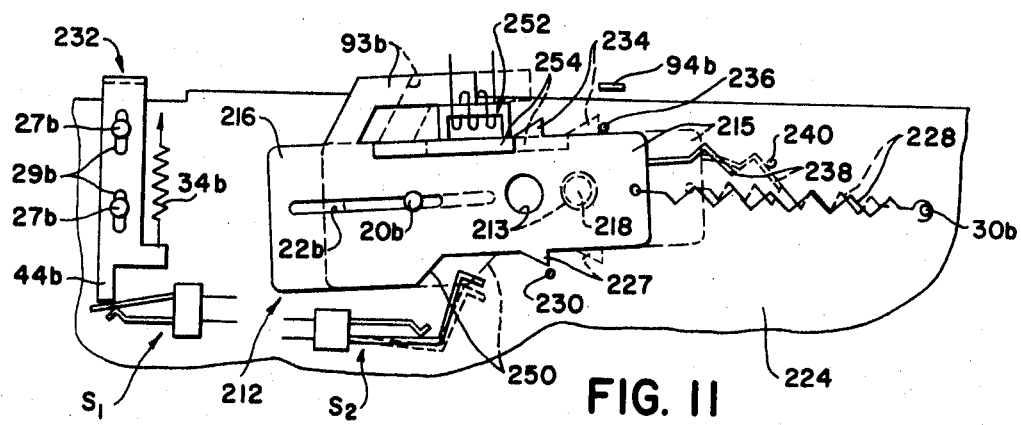
FIG. 11 is an elevational view of the embodiment of FIG. 10, shown in the aperture unblocking position during the exposure interval.
Figure 12:
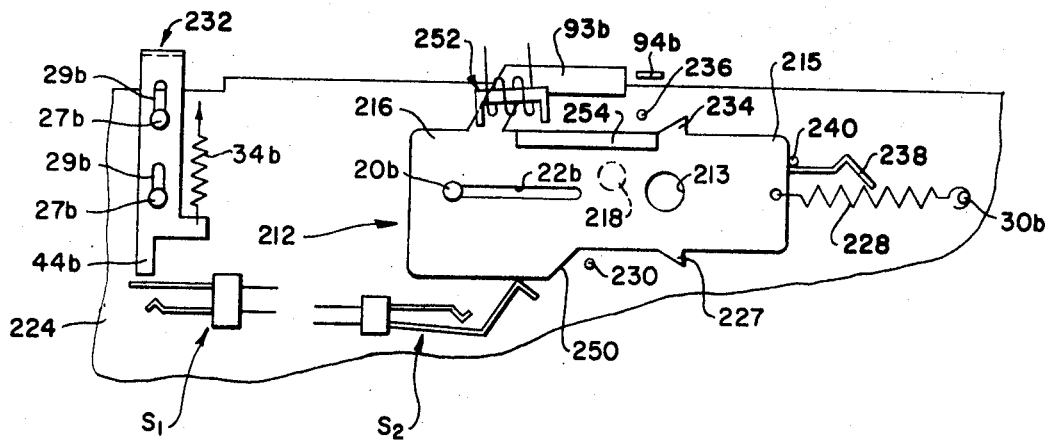
FIG. 12 is an elevational view of the apparatus of FIG. 11, shown in the second aperture blocking position after termination of an exposure interval.

In a further embodiment as shown in FIG. 10, a relatively long metal keeper 254 is positioned atop a blade 212 and adjacent to an electromagnet 252. The blade 212 defines an aperture 213 between ends 215 and 216, positioned below and offset from an exposure aperture 218 on a support structure 224. The blade 212 is held in its cocked position, against the bias of a spring 228, by the engagement of a detent 227 on the bottom edge of the blade 212 and a pin 230, secured on the support structure 224. In the cocked position of FIG. 10, the end 215 covers the exposure aperture 218. In this embodiment, the exposure interval is initiated electronically as a latch member 232 is depressed to close the normally open switch S1. Closure of the switch S1 energizes the electromagnet 252, and the electromagnet 252 attracts the metal keeper 254, pivoting the blade 212 upward and out of engagement with the pin 230. Under the influence of the spring 228, the blade 212 moves to the intermediate position shown in phantom lines of FIG. 11, where the blade aperture 213 and the exposure aperture 218 are aligned. As the blade 212 moves to the right, cam surface 250 engages and opens the switch S2 to initiate the timing cycle. As the blade 212 moves further to the right, to the position of FIG. 11, and the exposure apertures 213 and 218 coincide, a detent 234 positioned on the top edge of the blade 212 engages a pin 236, secured on the support structure 224, to retain the blade 212 in the aperture exposing position during the period that the electromagnet 252 is energized. A leaf spring 238 is also provided being positioned on the blade 212 so as to engage a pin 240, secured on the support structure 224, when the blade 212 is in the aperture exposing position of FIG. 11. In the position of FIG. 11, the leaf spring 238 provides a downward force to the blade 212. In this manner, at the end of the exposure period when the electromagnet 252 is deenergized by the circuit of FIG. 2, the leaf spring 238 pivots the blade 212 to free the detent 234 from the pin 236, permitting the blade 212 to move further to the right under influence of the spring 228, to the position of FIG. 12. In the position of FIG. 12 the end 216 covers the exposure aperture 218 and the blade 212 is held against the pin 240, terminating the exposure. The embodiment of FIGS. 10-12 is particularly suited for small cameras, or cameras that do not have sufficient space to mount the usual release members such as the latch member 32 of FIGS. 1 and 7.

It is to be understood that the circuit of FIG. 2 may be readily adapted to perform the function of energizing or deenergizing the electromagnets 152 and 252 at the initiation of the exposure interval, as well as the deenergization at its termination. For example, to energize the electromagnets 152 and 252 at the initiation of the exposure, the trigger circuit 66 is selected to be normally conducting as switch S1 is closed, and to be switched to the nonconducting state by the input at junction 64 at the end of the exposure interval.

Further, this invention is intended to cover all alternatives, modifications and equivalents as may be included within the spirit and scope of the invention as defined by the appended claims.

I claim:

1. Exposure control apparatus for controlling the duration of an interval of exposure of a light sensitive medium to object scene light through an exposure aperture, said apparatus comprising:

an apertured shutter blade mounted for pivotal and lateral movement, said shutter blade being selectively movable from a first aperture blocking position to an aperture unblocking position wherein said blade aperture and the exposure aperture are in alignment and from said aperture unblocking position to a second aperture blocking position;

means for moving said shutter blade from said first aperture blocking position toward said second aperture blocking position;

an electronic circuit including photosensitive means disposed to receive scene light, said photosensitive means having a parameter variable with the intensity of scene light and being arranged in, and operable with, said electronic circuit for providing an output signal after an interval of exposure which is related to said parameter;

means for retaining said shutter blade in said aperture unblocking position; and a transducer, coupled with said circuit and energizable by said signal, said transducer being located relative to said shutter blade for pivoting said shutter blade free from said retaining means to permit said moving means to move said shutter blade to said second aperture blocking position.

2. Apparatus as claimed in claim 1 wherein moving means includes a capping blade movable from a first position to a second position as said shutter blade moves from said second aperture blocking position to said first aperture blocking position, said capping blade in said second position blocking the exposure aperture when said blade aperture and the exposure aperture are aligned.

3. Exposure control apparatus for controlling an interval of exposure of a light sensitive medium to scene light through an exposure aperture, said exposure control apparatus comprising:

a shutter blade mounted for lateral and pivotal motion, said shutter blade defining a blade aperture and being movable from a first exposure aperture blocking position to an exposure aperture unblocking position wherein said blade aperture and the exposure aperture are aligned during the interval of exposure, said shutter blade being movable to a second exposure aperture blocking position at the end of the interval of exposure;

means for moving said shutter blade toward said second aperture blocking position;

an electronic circuit including photosensitive means disposed to receive scene light for establishing the interval of exposure as a function of the intensity of the scene light; and a transducer coupled with said electronic circuit, said transducer being energizable at the initiation of the interval of exposure and de-energizable at the end of the interval of exposure, said transducer being located relative to said shutter blade for aligning the exposure aperture and blade aperture when said transducer becomes energized and for releasing said shutter blade when said transducer becomes deenergized to permit said moving means to urge said shutter blade to said second aperture blocking position.

4. Apparatus as claimed in claim 3 wherein said shutter blade includes detent means for engaging a stop member when said shutter blade is in said aperture unblocking position, and said moving means is disposed relative to said shutter blade for pivoting said shutter blade to free said detent from said stop member.

5. Apparatus as claimed in claim 4 wherein said shutter blade includes keeper means for engaging said transducer when said transducer is actuated and said shutter blade is in said aperture unblocking position.

6. Exposure control apparatus for controlling an interval of exposure of a light sensitive medium to object scene light through an exposure aperture, said apparatus comprising:

an electronic circuit including photosensitive means having a parameter varying as the intensity of the scene light varies, said photosensitive means arranged in said electronic circuit for controlling the interval of exposure as a function of said parameter;

a shutter blade defining an aperture, said shutter blade being mounted for lateral and pivotal movement from a first aperture blocking position to an aperture unblocking position wherein said blade aperture and said exposure aperture are in alignment during the interval of exposure and movable to a second aperture blocking position at the end of the interval of the exposure;

means for retaining said shutter blade in said first aperture blocking position;

means for moving said shutter blade from said first toward said second aperture blocking position;

stop means for engaging said shutter blade at said aperture unblocking position;

a transducer located in spaced relation to said shutter blade and being energizable by said electronic circuit for releasing said shutter blade from said retaining means so that said blade moves toward said aperture unblocking position and for retaining said shutter blade against said stop means during the interval of exposure, said transducer being de-energizable at the end of the interval for permitting said moving means to move said blade to said second aperture blocking position.

7. Apparatus as claimed in claim 6 wherein said retaining means comprises a first detent on said shutter blade disposed to engage a first stop means when said shutter blade is in said first aperture blocking position.

8. Apparatus as claimed in claim 7 wherein said retaining means comprises a second detent and keeper means on said shutter blade, said keeper means attracted toward said transducer when said transducer is actuated to pivot said shutter blade into engagement with said second stop member and to align said blade aperture with the exposure aperture.

9. Apparatus as claimed in claim 8 wherein said means for moving comprises first and second spring means, said first spring means comprising a leaf spring disposed to engage a stop member when said shutter blade is in said aperture unblocking position, said first spring means urging said shutter blade pivotally, and said second spring means urging said shutter blade laterally.

* * * * *